US012803085B2

(12) United States Patent
Kiyabu et al.

(10) Patent No.: US 12,803,085 B2
(45) Date of Patent: Nov. 17, 2026

(54) METAL-AIR BATTERY SYSTEM

(71) Applicants: MITSUBISHI HEAVY INDUSTRIES, LTD., Tokyo (JP); CHULALONGKORN UNIVERSITY, Bangkok (TH)

(72) Inventors: Toshiyasu Kiyabu, Tokyo (JP); Yoshinori Noguchi, Tokyo (JP); Soorathep Kheawhom, Bangkok (TH)

(73) Assignees: MITSUBISHI HEAVY INDUSTRIES, LTD., Tokyo (JP); CHULALONGKORN UNIVERSITY, Bangkok (TH)

(*) Notice: Subject to any disclaimer, the term of this patent is extended or adjusted under 35 U.S.C. 154(b) by 474 days.

(21) Appl. No.: 18/563,378

(22) PCT Filed: Jun. 21, 2022

(86) PCT No.: PCT/JP2022/024690
§ 371 (c)(1),
(2) Date: Nov. 22, 2023

(87) PCT Pub. No.: WO2023/276778
PCT Pub. Date: Jan. 5, 2023

(65) Prior Publication Data

US 2024/0222745 A1 Jul. 4, 2024

(30) Foreign Application Priority Data

Jul. 2, 2021 (JP) ................................ 2021-110540

(51) Int. Cl.
*H01M 12/08* (2006.01)
*H01M 4/76* (2006.01)
(Continued)

(52) U.S. Cl.
CPC ........... *H01M 12/08* (2013.01); *H01M 4/765* (2013.01); *H01M 8/023* (2013.01); *H01M 10/0445* (2013.01)

(58) Field of Classification Search
CPC ...... H01M 12/08; H01M 4/765; H01M 8/023; H01M 10/0445
See application file for complete search history.

(56) References Cited

U.S. PATENT DOCUMENTS 4,341,847 A * 7/1982 Sammells ............. H01M 8/184 429/94
2013/0078535 A1* 3/2013 Aizawa ............... H01M 4/8657 429/403
(Continued)

FOREIGN PATENT DOCUMENTS

JP S47-25917 U 11/1972
JP 2014127289 A 7/2014
(Continued)

OTHER PUBLICATIONS

International Search Report and Written Opinion issued in International Application No. PCT/JP2022/024690, mailed on Aug. 30, 2022 (9 pages).
(Continued)

*Primary Examiner* — Sadie White
(74) *Attorney, Agent, or Firm* — Osha Bergman Watanabe & Burton LLP

(57) ABSTRACT

A metal-air battery system includes a cell including: a chamber; and an electrode device housed in the chamber. The electrode device includes: a first electrode; a tubular second electrode disposed so as to surround the first electrode on a radially outer side of the first electrode; and a tubular third electrode disposed so as to surround the second electrode on a radially outer side of the second electrode, and is configured such that an electrolyte solution flows at
(Continued)

least between an outer peripheral surface of the first electrode and an inner peripheral surface of the third electrode. A combination of the first electrode, the second electrode, and the third electrode is a combination of a negative electrode containing metal, a charging positive electrode, and a discharging positive electrode.

13 Claims, 11 Drawing Sheets

(51) Int. Cl.
*H01M 8/023* (2016.01)
*H01M 10/04* (2006.01)

(56) References Cited

U.S. PATENT DOCUMENTS

| | | | |
|---|---|---|---|
| 2016/0104926 | A1 | 4/2016 | Nitta |
| 2018/0190993 | A1 | 7/2018 | Nishiura et al. |

FOREIGN PATENT DOCUMENTS

| | | | |
|---|---|---|---|
| JP | 2015170400 | A | 9/2015 |
| JP | 2016081572 | A | 5/2016 |
| JP | 2017016902 | A | 1/2017 |
| JP | 2017107692 | A | 6/2017 |
| WO | 2011152464 | A1 | 12/2011 |
| WO | 2012012558 | A2 | 1/2012 |

OTHER PUBLICATIONS

International Preliminary Report on Patentability issued in counterpart International Application No. PCT/JP2022/024690, mailed Jan. 11, 2024 (12 pages).

* cited by examiner

METAL-AIR BATTERY SYSTEM

TECHNICAL FIELD

The present disclosure relates to a metal-air battery system.

This application claims the priority of Japanese Patent Application No. 2021-110540 filed on Jul. 2, 2021, the content of which is incorporated herein by reference.

BACKGROUND

A metal-air battery system is known which uses metal as a negative electrode active material and oxygen (air) as a positive electrode active material. Patent Document 1 describes a cylindrical three-electrode metal-air battery system in which a cylindrical fuel electrode, auxiliary electrode, and air electrode immersed in an electrolyte solution are concentrically arranged. This metal-air battery system can be used as a secondary battery in which the fuel electrode and the auxiliary electrode are used to charge and the fuel electrode and the air electrode are used to discharge, and can be used as a fuel cell in which zinc pellets are introduced to the auxiliary electrode having a holding structure and the auxiliary electrode and the air electrode are used to generate electricity.

CITATION LIST

Patent Literature

Patent Document 1: JP2015-170400A

SUMMARY

Technical Problem

If electricity needs to be stored in the metal-air battery system, the electrolyte solution is stored in a tank, and the electrolyte solution is supplied in circulation by a pump. However, in the metal-air battery system of Patent Document 1, the electrolyte solution is not configured to be supplied in circulation, and if the electrolyte solution is configured to be supplied in circulation, the zinc pellets introduced to the auxiliary electrode may flow away along with the electrolyte solution. Therefore, it is not envisaged that the metal-air battery system of Patent Document 1 would be modified such that the electrolyte solution is supplied in circulation, and further such modification cannot be made easily.

In view of the above, an object of at least one embodiment of the present disclosure is to provide a metal-air battery system that can store electricity, and charge and discharge efficiently.

Solution to Problem

In order to achieve the above-described object, a metal-air battery system according to the present disclosure is a metal-air battery system that includes a cell including: a chamber; and an electrode device housed in the chamber. The electrode device includes: a first electrode; a tubular second electrode disposed so as to surround the first electrode on a radially outer side of the first electrode; and a tubular third electrode disposed so as to surround the second electrode on a radially outer side of the second electrode, and is configured such that an electrolyte solution flows at least between an outer peripheral surface of the first electrode and an inner peripheral surface of the third electrode. A combination of the first electrode, the second electrode, and the third electrode is a combination of a negative electrode containing metal, a charging positive electrode, and a discharging positive electrode.

Advantageous Effects

According to the metal-air battery system of the present disclosure, since a difference in electrode area between the inner side and the outer side can be obtained by arranging electrodes such that their cross sections are concentric, it is possible to reduce a current density during operation of the electrodes arranged on the outer side compared to that of the central electrode. The resistance of the system can be reduced by utilizing this effect to arrange, on the outer side, the electrodes requiring a reduction in resistance loss, making it possible to efficiently charge/discharge. Further, since the electrolyte solution is supplied in circulation to the cell, electricity can be stored.

DETAILED DESCRIPTION

Hereinafter, a metal-air battery system according to embodiments of the present disclosure will be described with reference to the drawings. The embodiment to be described below indicates one aspect of the present disclosure, does not intend to limit the disclosure, and can optionally be modified within a range of a technical idea of the present disclosure.

Embodiment 1

Figure 1:
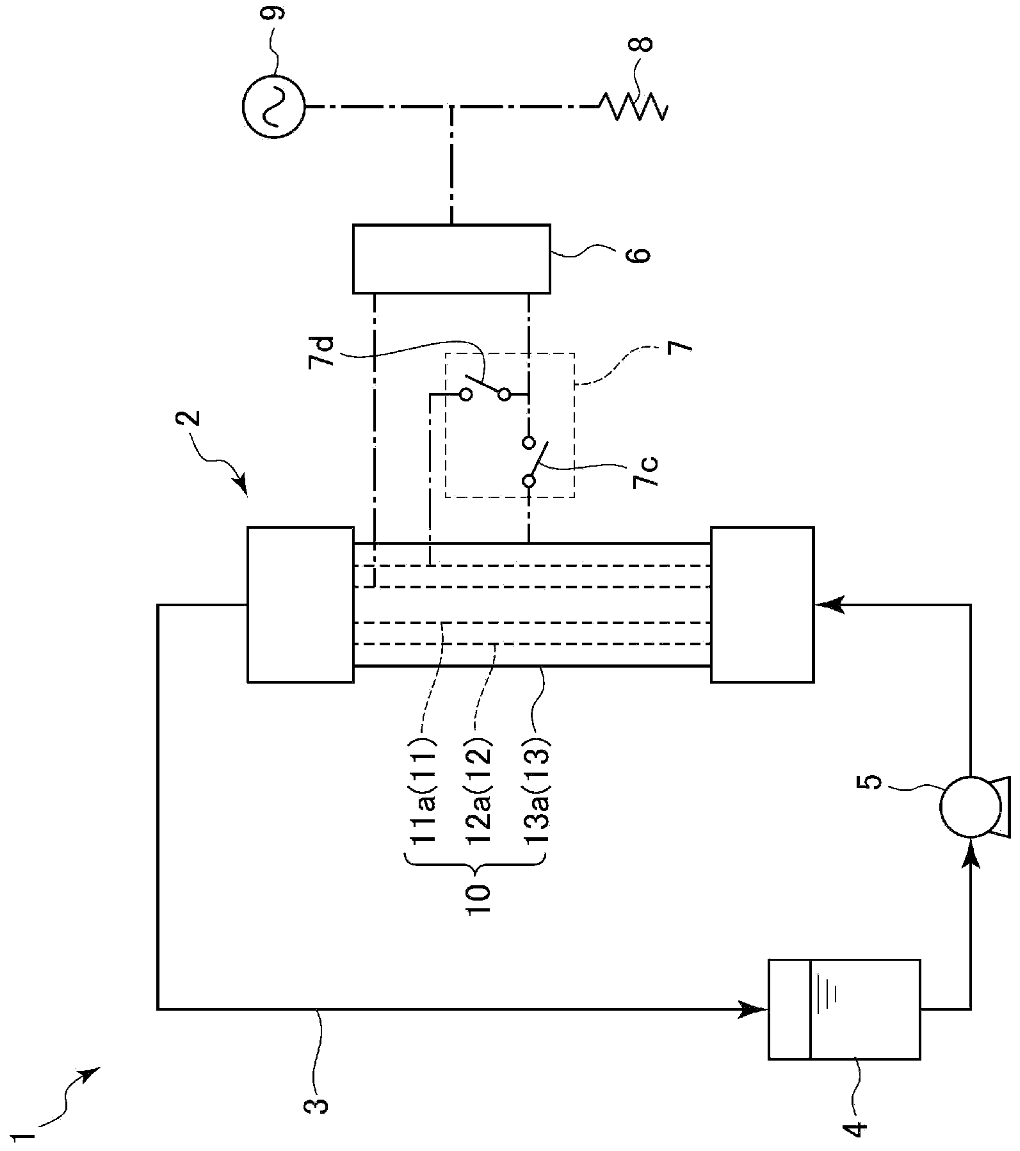
FIG. 1 is a schematic configuration diagram of a metal-air battery system according to Embodiment 1 of the present disclosure.

Configuration of Metal-Air Battery System According to Embodiment 1 of Present Disclosure As shown in FIG. 1, a metal-air battery system 1 according to Embodiment 1 of the present disclosure includes a cylindrical three-electrode cell 2. Both ends of a circulation line 3 for an electrolyte solution are connected to the cell 2 in order to flow the electrolyte solution inside the cell 2. The circulation line 3 includes an electrolytic tank 4 for storing the electrolyte solution, and a pump 5.

As the electrolyte solution, it is possible to use either an aqueous electrolyte solution in which an electrolyte is dissolved in water or a non-aqueous electrolyte in which an electrolyte is dissolved in a non-aqueous solution such as an organic solvent. As the aqueous electrolyte solution, it is possible to use, for example, an aqueous solution in which a hydroxide such as potassium, sodium, lithium, barium, or magnesium, a chloride, a phosphate, a borate, a sulfate, etc. is used as an electrolyte. That is, any indicator salt for imparting electrical conductivity of the aqueous solution can be used as the electrolyte. As the non-aqueous electrolyte solution, it is possible to use, for example, a solution obtained by dissolving an indicator salt containing an alkali metal etc. in a liquid such as a cyclic or chain carbonate, a cyclic or chain ester, a cyclic or chain ether, a sulfone compound, an ionic liquid, etc.

The cell 2 includes an electrode device 10 that has a shape extending in the axial direction, and includes a first electrode 11, a tubular second electrode 12 disposed so as to surround the first electrode 11 on a radially outer side of the first electrode 11, and a tubular third electrode 13 disposed so as to surround the second electrode 12 on a radially outer side of the second electrode. Herein, "surround" means a configuration in which at least a part of the first electrode 11 in a length direction and at least a part of the second electrode 12 in a length direction are housed inside the second electrode 12 and the third electrode 13, respectively. That is, the first electrode 11, the second electrode 12, and the third electrode 13 are disposed such that their cross sections perpendicular to the axial direction have a concentric shape (a concentric circular shape if these electrodes are cylindrical). In Embodiment 1, the first electrode 11 is a negative electrode 11*a*, the second electrode 12 is a charging positive electrode 12*a* used together with the negative electrode 11*a* during charging of the metal-air battery system 1, and the third electrode 13 is a discharging positive electrode 13*a* used together with the negative electrode 11*a* during discharging of the metal-air battery system 1.

The negative electrode 11*a* may be a tubular electrode made of metal such as zinc, or may be an electrode in which a surface of a tubular body made of other metal such as stainless steel or aluminum is plated with zinc. In the latter case, it is only necessary that at least an outer surface, of the surface of the negative electrode 11*a*, facing the charging positive electrode 12*a* is plated with zinc. The metal contained in the negative electrode 11*a* is not limited to zinc. Iron, aluminum, lithium, sodium, potassium, copper, magnesium, etc., or alloys thereof can be used depending on the type of electrolyte solution (for example, a difference in aqueous electrolyte solution/non-aqueous electrolyte solution). A tubular electrode made of a non-oxidizing porous metal material such as nickel, nickel alloy, or stainless steel in a mesh shape can be used as the charging positive electrode 12*a*.

As the discharging positive electrode 13*a*, it is possible to use, for example, an electrode having a three-layer structure including a porous outermost layer in which oxygen can diffuse, a porous intermediate layer formed of metal such as nickel, and an innermost layer in which an oxygen reduction catalyst is supported on a conductive material such as carbon. As the oxygen reduction catalyst, a catalyst mainly containing platinum as an active component (for example, platinum-supported carbon) can be used under an acidic liquid environment. Also, under an alkaline liquid environment, a catalyst can be used, which contains 3d transition metal such as iron, manganese, nickel, or cobalt, or its oxide as an active component. In addition, a catalyst containing ruthenium, silver, gold, or iridium as an active component can also be used under both the acidic liquid environment and the alkaline liquid environment. Further, a catalyst can also be used, which contains an organometallic complex, a carbon fiber (for example, a carbon nanotube), a nitrogen carbide, etc. as an active component. Moreover, according to this configuration, since electrode areas of the charging positive electrode 12*a* and the discharging positive electrode 13*a* can be greater than that of the negative electrode 11*a*, a current density during charging/discharging can be lower than that of the negative electrode 11*a*. Whereby, it is possible to expect an effect of being able to relatively reduce a loss due to resistance of the charging positive electrode 12*a* and the discharging positive electrode 13*a*.

The metal-air battery system 1 can further include a switching device 7. The negative electrode 11*a* is electrically connected to an AC/DC converter 6, and the charging positive electrode 12*a* and the discharging positive electrode 13*a* are connected to the AC/DC converter 6 via the switching device 7 which is switchable such that either one of the charging positive electrode 12*a* or the discharging positive electrode 13*a* energizes the AC/DC converter 6, that is, the negative electrode 11*a* is electrically connected to either one of the charging positive electrode 12*a* or the discharging positive electrode 13*a*. The AC/DC converter 6 can electrically be connected to a load 8 and an AC power source 9. The AC/DC converter 6 is not required if a DC power source is used in place of the AC power source 9 and the load 8 operates on DC current.

Figure 2:
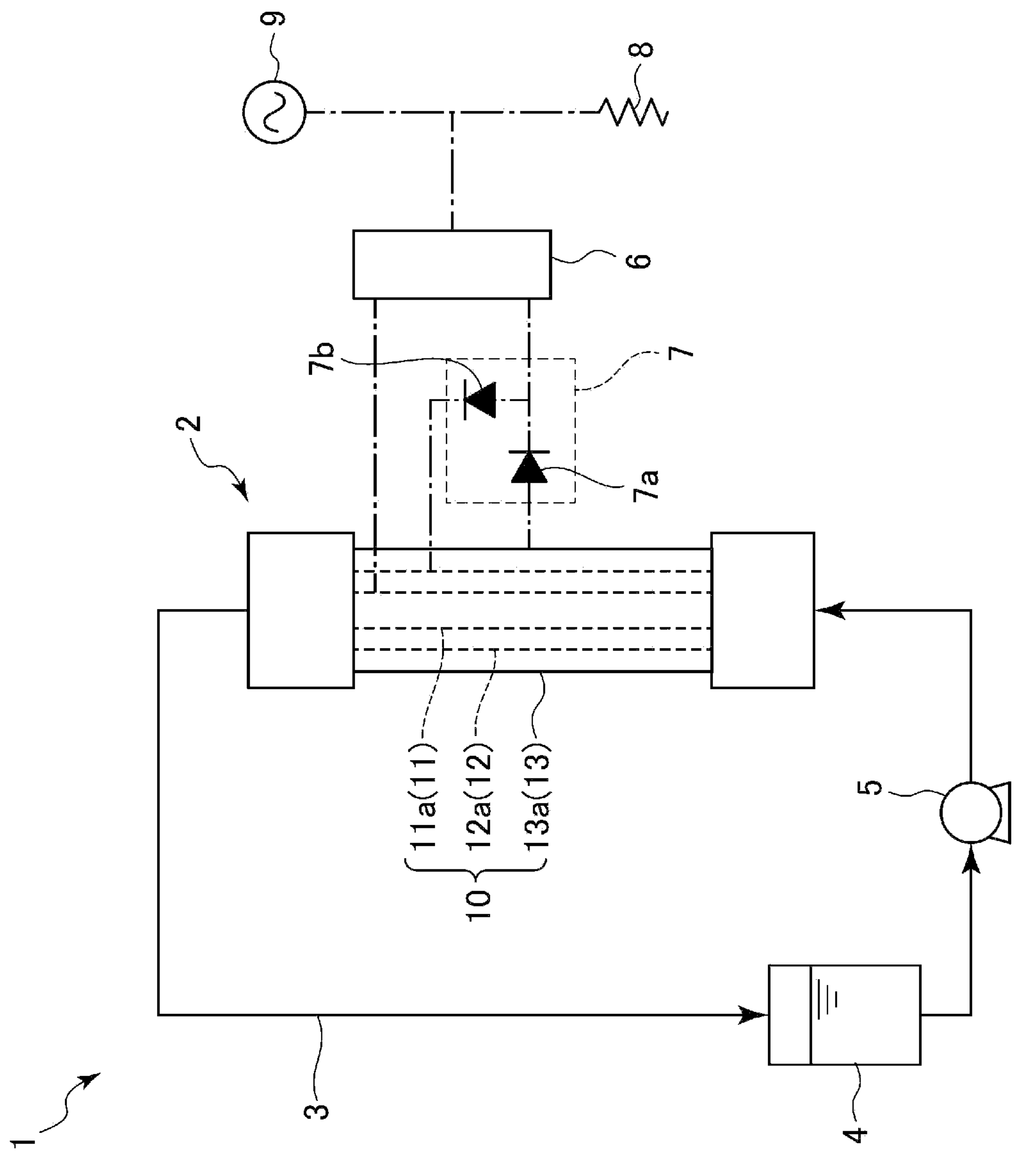
FIG. 2 is a schematic configuration diagram showing a modified example of the metal-air battery system according to Embodiment 1 of the present disclosure.

Although the configuration of the switching device 7 is not particularly limited, for example, the switching device 7 may be composed of a first switch 7*c* for electrically opening and closing between the discharging positive electrode 13*a* and the negative electrode 11*a*, and a second switch 7*d* for electrically opening and closing between the negative electrode 11*a* and the charging positive electrode 12*a* (hereinafter, referred to as the "switch-type switching device 7"). The first switch 7*c* and the second switch 7*d* are not limited to mechanical switches, and may be semiconductor switches. Further, as shown in FIG. 2, the switching device 7 may be composed of a first diode 7*a* for flowing a current in a direction from the discharging positive electrode 13*a* to the negative electrode 11*a*, and a second diode 7*b* for flowing a current in a direction from the negative electrode 11*a* to the charging positive electrode 12*a* (hereinafter, referred to as the "diode-type switching device 7"). The diode-type switching device 7 is superior in terms of durability and cost compared to the switch-type switching device 7 composed of the mechanical switches, and is superior in terms of cost compared to the switch-type switching device 7 composed of the semiconductor switches. Since the charging positive electrode 12*a* does not undergo a discharge reaction in a state where the charging positive electrode 12*a* is immersed in the electrolyte solution, the second diode 7*b* may not be provided (the switching device 7 is composed only of the first diode 7*a*). Also, the first diode 7*a* may not be provided, either (that is, a configuration in which the switching device 7 is not provided) if it is not necessary to consider the reaction at the discharging positive electrode 13*a* during charging.

Figure 3:
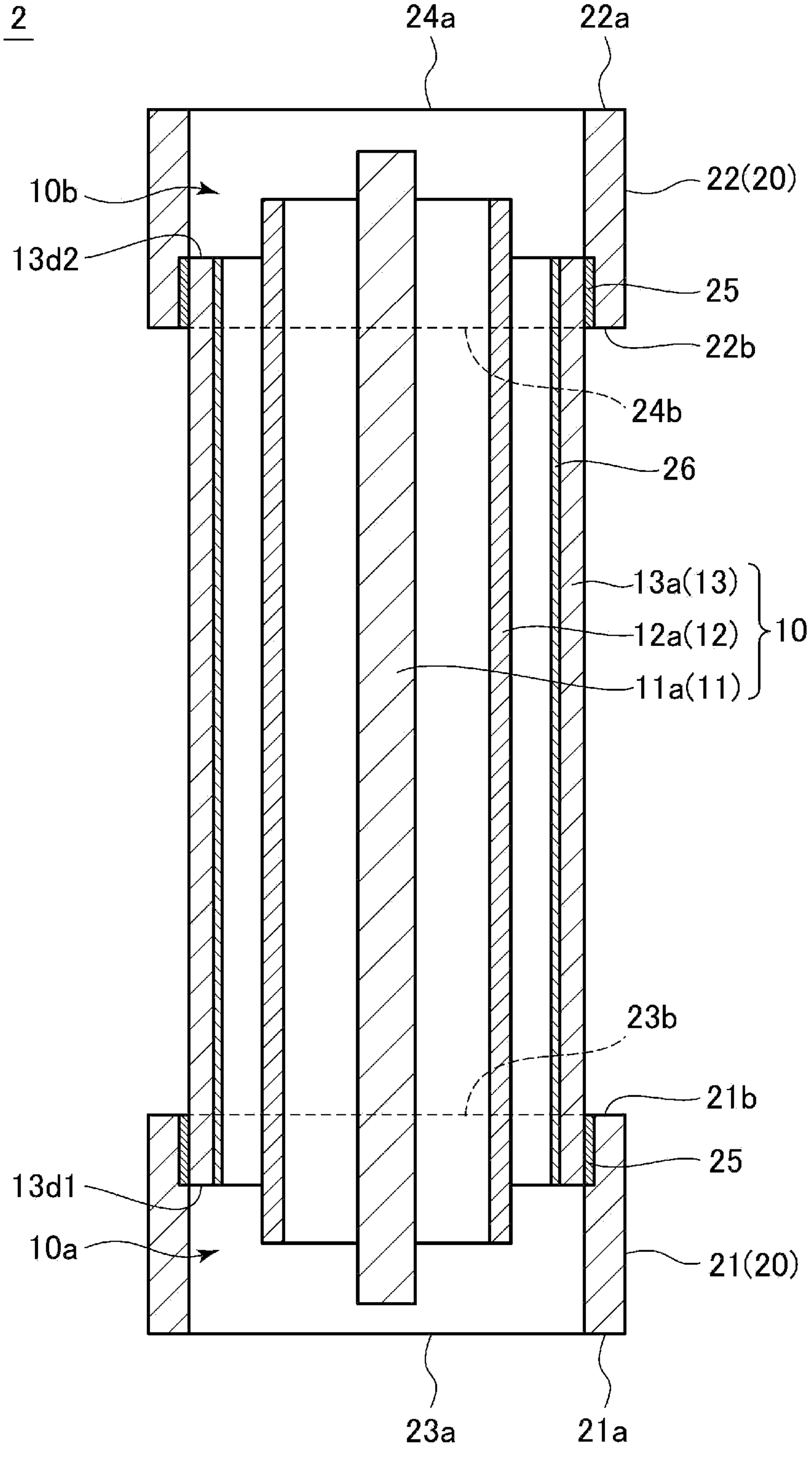
FIG. 3 is a cross-sectional schematic diagram showing the configuration of a three-electrode cell of the metal-air battery system according to Embodiment 1 of the present disclosure.

As shown in FIG. 3, the cell 2 includes a chamber 20 for housing the electrode device 10. The chamber 20 includes a first chamber section 21 provided so as to internally house at least one end portion 13*d*1 of the third electrode 13 on a side of a first end portion 10*a* which is one end portion of the electrode device 10, and a second chamber section 22 provided so as to internally house at least another end portion 13*d*2 of the third electrode 13 on a side of a second end portion 10*b* which is another end portion of the electrode device 10.

The first chamber section 21 has a first end face 21*a* and a second end face 21*b* located away from each other in the axial direction of the cell 2, and the first end face 21*a* and the second end face 21*b* are respectively formed with a first opening 23*a* and a second opening 23*b*. The second chamber section 22 has a third end face 22*a* and a fourth end face 22*b* located away from each other in the axial direction of the cell 2, and the third end face 22*a* and the fourth end face 22*b* are respectively formed with a third opening 24*a* and a fourth opening 24*b*.

The first electrode 11, the second electrode 12, and the third electrode 13 are respectively inserted into the second opening 23*b* and the fourth opening 24*b*, and a seal member 25 for sealing between an outer peripheral surface of the third electrode 13 and respective inner peripheral surfaces of the first chamber section 21 and the second chamber section 22 is disposed therebetween. The seal member 25 can suppress leakage of the electrolyte solution from the chamber 20 between the first opening 23*a* and the third opening 24*a*. The seal member 25 may be an adhesive agent, a heat-shrinkable tube, a heat seal, a resin weld, or the like.

The inner peripheral surface of the discharging positive electrode 13*a*, that is, the surface facing the negative electrode 11*a* is provided with a separation membrane 26. As the separation membrane 26, it is possible to use, for example, an anion exchange membrane, or a microporous membrane formed from polymer, solid oxide, or the like. Although the configuration of the anion exchange membrane is not particularly limited, it is preferable to use a high-performance membrane with high ion conductivity and strength. Also, the configuration of the microporous membrane is not particularly limited, either and commercially available membranes for various purposes can be used. Although it is preferable to use a microporous membrane suitable for an aqueous solution system if the aqueous electrolyte solution is used, any resin-made microporous membrane can be used as long as hydrophilic treatment is applied to a surface, for example, modifying the surface with a hydrophilic group, adding a surfactant to the surface, or combining the surface with oxide particles.

Operation of Metal-Air Battery System According to Embodiment 1 of Present Disclosure Next, the operation of the metal-air battery system 1 will be described with reference to FIGS. 1 to 3. First, the operation in which current flows through the load 8 due to the discharge of the metal-air battery system 1 will be described. The pump 5 is started in a state where the switching device 7 is operated to electrically connect the negative electrode 11*a* to the discharging positive electrode 13*a*, and the electrolyte solution is supplied from the electrolytic tank 4 to the cell 2 via the circulation line 3. The electrolyte solution circulates through the circulation line 3 by returning to the electrolytic tank 4 via the circulation line 3 after passing through the cell 2.

In the cell 2, the electrolyte solution having flowed into the first chamber section 21 via the first opening 23*a* flows into, via the first end portion 10*a* of the electrode device 10, flow paths formed between the outer peripheral surface of the negative electrode 11*a* and the inner peripheral surface of the discharging positive electrode 13*a*, that is, a flow path formed between the outer peripheral surface of the negative electrode 11*a* and the inner peripheral surface of the charging positive electrode 12*a* and a flow path formed between the outer peripheral surface of the charging positive electrode 12*a* and the inner peripheral surface of the discharging positive electrode 13*a*, and flows through these flow paths. The electrolyte solution having flowed through these flow paths flows out from these flow paths to the second chamber section 22 via the second end portion 10*b* of the electrode device 10, and flows out from the second chamber section 22 via the third opening 24*a*.

While the electrolyte solution thus flows in the cell 2, the following reaction occurs in the negative electrode 11*a* and the discharging positive electrode 13*a*. In the negative electrode 11*a*, metal contained in the negative electrode 11*a*, such as zinc, reacts with hydroxide ions in the electrolyte solution to generate zincate ions, and electrons are emitted to the negative electrode 11*a* and flow to the discharging positive electrode 13*a*. In the discharging positive electrode 13*a*, oxygen contained in air outside the cell 2 diffuses through the outermost layer and the intermediate layer, and hydroxide ions are produced by reactions between the air, water in the electrolyte solution, and the electrons flowing to the discharging positive electrode 13*a* due to the oxygen reduction catalyst in the innermost layer. The produced hydroxide ions are used in the above-described reaction at the negative electrode 11*a*.

If the anion exchange membrane which is the separation membrane 26 is provided on the inner peripheral surface of the discharging positive electrode 13*a*, that is, the innermost layer (a layer where the oxygen reduction catalyst is supported on the conductive material) of the discharging positive electrode 13*a*, oxygen molecules react at a reaction interface (three-phase interface) where the oxygen reduction catalyst/conductive material/ionic conductor contact, producing hydroxide ions. The produced hydroxide ions move into the electrolyte solution through the ionic conductor. Whereby, the reaction interface by ionomer contact with the oxygen reduction catalyst is extended and the resistance is reduced. In addition, if the separation membrane 26 is provided on the inner peripheral surface of the discharging positive electrode 13*a*, it is possible to suppress leakage of the electrolyte solution to the outside of the cell 2 via the discharging positive electrode 13*a* or clogging of the intermediate layer and the outermost layer of the discharging positive electrode 13*a*. Further, precipitation of carbonate from the electrolyte solution and clogging of the intermediate layer and the outermost layer of the discharging positive electrode 13*a* can be suppressed by suppressing mixing of carbon dioxide contained in the air into the electrolyte solution. Therefore, it is possible to reduce an overvoltage loss of the reaction in the discharging positive electrode 13*a*, and it is possible to suppress alteration, deterioration, or leakage of the electrolyte solution.

As electrons flow from the negative electrode 11*a* to the discharging positive electrode 13*a* by such operation, DC current flows from the discharging positive electrode 13*a* to the negative electrode 11*a*. The AC/DC converter 6 converts this DC current into AC current and supplies AC current to the load 8.

Next, the charging operation of the metal-air battery system 1 will be described. The electrolyte solution is circulated in a state where the switching device 7 is operated to electrically connect the negative electrode 11*a* to the charging positive electrode 12*a*. The AC current from the AC power source 9 is converted into DC current by the AC/DC converter 6, and the DC current flows to the charging positive electrode 12*a*. That is, electrons flow to the negative electrode 11*a*. At the negative electrode 11*a*, zinc ions in the electrolyte solution receive electrons, thereby depositing zinc on the negative electrode 11*a*, and the metal-air battery system 1 is charged.

No problem occurs if zinc is uniformly deposited on the surface of the negative electrode 11*a* during such charging, but in reality, a dendrite partially extending like needles may be generated. If the dendrite is generated and grows, the dendrite may connect the negative electrode 11*a* and the charging positive electrode 12*a*. Then, an internal short circuit occurs and the voltage of the battery becomes 0 V, making it impossible to charge the battery.

In the event that such internal short circuit occurs, if the switching device 7 is provided, the negative electrode 11*a* is electrically connected to the discharging positive electrode 13*a* by closing the first switch 7*c* and opening the second switch 7*d*, thereby switching from the charging state to the discharging state. Even if the negative electrode 11*a* and the charging positive electrode 12*a* are internally short-circuited by the dendrite, the negative electrode 11*a* and the charging positive electrode 12*a* are electrically separated, allowing for discharge using the negative electrode 11*a* and the discharging positive electrode 13*a*. During discharging, zinc is eluted as zinc ions from the negative electrode 11*a* into the electrolyte solution, eliminating the internal short circuit.

Since the difference in electrode area between the inner side and the outer side can be obtained by arranging the negative electrode 11*a*, the charging positive electrode 12*a*, and the discharging positive electrode 13*a* such that their cross sections are concentric, it is possible to reduce the current density during operation of the charging positive electrode 12*a* and the discharging positive electrode 13*a* arranged on the outer side compared to that of the central negative electrode 11*a*. The resistance of the system can be reduced by utilizing this effect to arrange the charging positive electrode 12*a* and the discharging positive electrode 13*a*, which require a reduction in resistance loss, on the outer side, making it possible to efficiently charge/discharge. Further, since the electrolyte solution is supplied in circulation to the cell, electricity can be stored.

In addition, since the switch-type switching device 7 is provided, the negative electrode 11*a* and the charging positive electrode 12*a* are used to charge and the negative electrode 11*a* and the discharging positive electrode 13*a* are used to discharge, making it possible to discharge even if internal short circuit occurs during charging. Whereby, it is possible to charge/discharge without any trouble. Further, since the electrolyte solution is supplied in circulation to the cell 2, electricity can be stored. On the other hand, since either the switch-type or diode-type switching device 7 is provided, it is possible to reduce the risk of opposite reactions occurring at the positive electrode during charging and discharging, and improvements in efficiency and lifetime can be expected.

Modified Example of Metal-Air Battery System According to Embodiment 1 of Present Disclosure In Embodiment 1, although the negative electrode 11*a* does not have a tubular shape, the negative electrode 11*a* may also have the tubular shape just like the charging positive electrode 12*a* and the discharging positive electrode 13*a*. In this case, since the electrolyte solution also flows into the negative electrode 11*a*, the configuration is preferable in which the inner peripheral surface of the negative electrode 11*a* also contains zinc.

Embodiment 2

Next, the metal-air battery system according to Embodiment 2 will be described. The metal-air battery system according to Embodiment 2 is obtained by modifying the configuration of the electrode device 10 with respect to Embodiment 1. In Embodiment 2, the same constituent elements as those in Embodiment 1 are associated with the same reference signs and not described again in detail.

Figure 4:
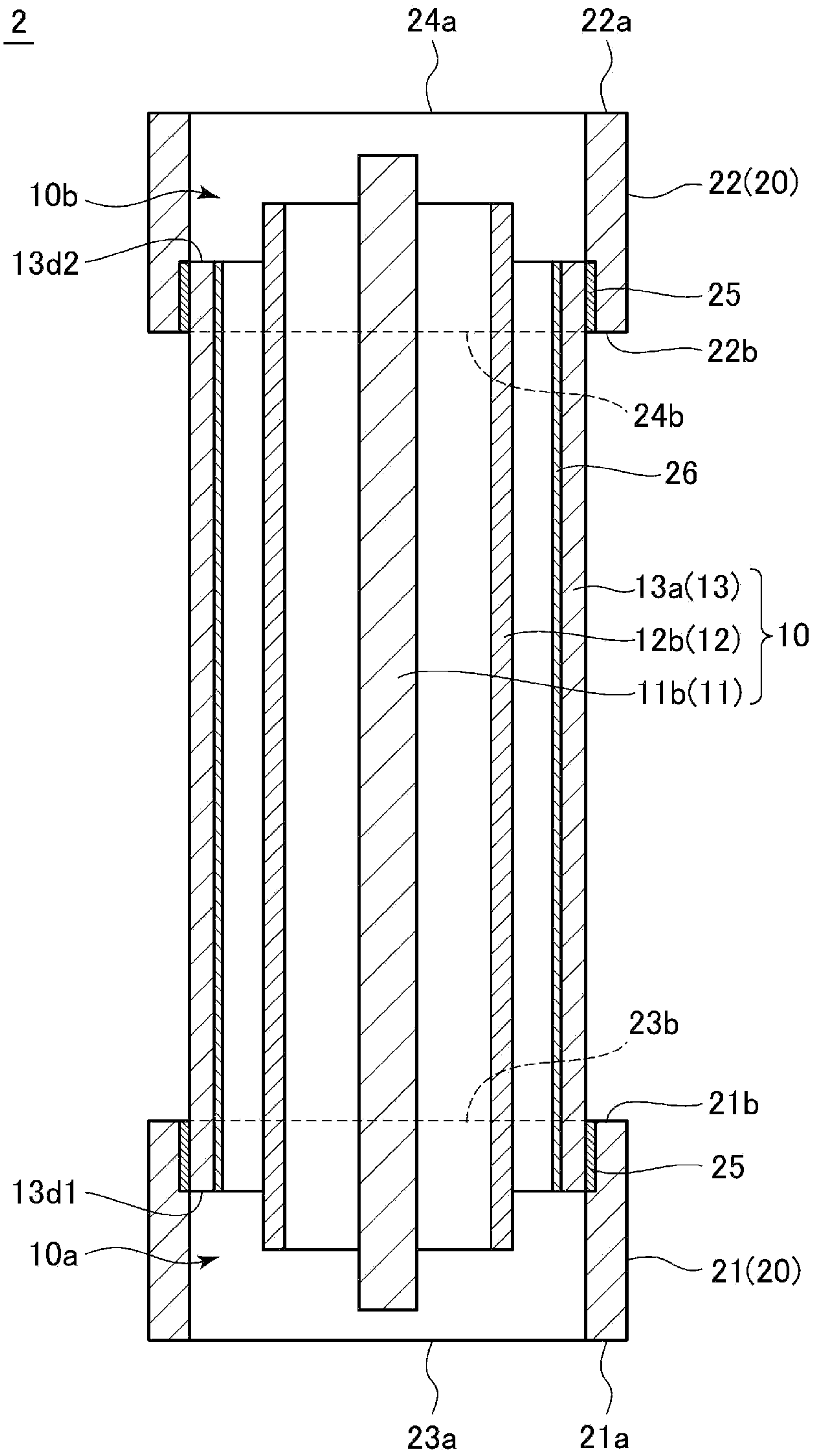
FIG. 4 is a cross-sectional schematic diagram showing the configuration of the three-electrode cell of the metal-air battery system according to Embodiment 2 of the present disclosure.

Configuration of Metal-Air Battery System According to Embodiment 2 of Present Disclosure As shown in FIG. 4, in Embodiment 2 of the present disclosure, the cell 2 includes the electrode device 10 with a charging positive electrode 11*b* as the first electrode 11, a negative electrode 12*b* as the second electrode 12, and the discharging positive electrode 13*a* as the third electrode 13. The negative electrode 12*b* has a tubular shape, and the negative electrode 12*b* is configured to contain zinc not only on its outer peripheral surface but also on its inner peripheral surface. Further, as in Embodiment 1, an electrode having a tubular shape manufactured in a mesh shape may be used as the charging positive electrode 11*b*. In Embodiment 2, however, the charging positive electrode 11*b* will be described as an electrode having a non-mesh non-tubular shape, that is, a bar shape. Other configurations are the same as those in Embodiment 1.

Operation of Metal-Air Battery System According to Embodiment 2 of Present Disclosure The operation in Embodiment 2 is the same as that in Embodiment 1. That is, in the metal-air battery system 1 according to Embodiment 2 as well, the negative electrode 12*b* and the charging positive electrode 11*b* are used to charge and the negative electrode 12*b* and the discharging positive electrode 13*a* are used to discharge, making it possible to discharge even if internal short circuit occurs during charging. In Embodiment 2 as well, since the charging positive electrode 11*b*, the negative electrode 12*b*, and the discharging positive electrode 13*a* are disposed such that their cross sections are concentric, the same technical effect as in Embodiment 1 can be obtained.

In Embodiment 2, a measuring instrument is provided to measure a potential difference between the negative electrode 12*b* and the discharging positive electrode 13*a*, and this potential difference is monitored during charging, making it possible to detect that internal short circuit has occurred between the negative electrode 12*b* and the discharging positive electrode 13*a*. If the internal short circuit between the negative electrode 12*b* and the discharging positive electrode 13*a* is detected, the internal short circuit can be eliminated by discharging using the negative electrode 12*b* and the charging positive electrode 11*b*.

Embodiment 3

Next, the metal-air battery system according to Embodiment 3 will be described. The metal-air battery system according to Embodiment 3 is obtained by modifying the configuration of the electrode device 10 with respect to Embodiment 1. In Embodiment 3, the same constituent elements as those in Embodiment 1 are associated with the same reference signs and not described again in detail.

Figure 5:
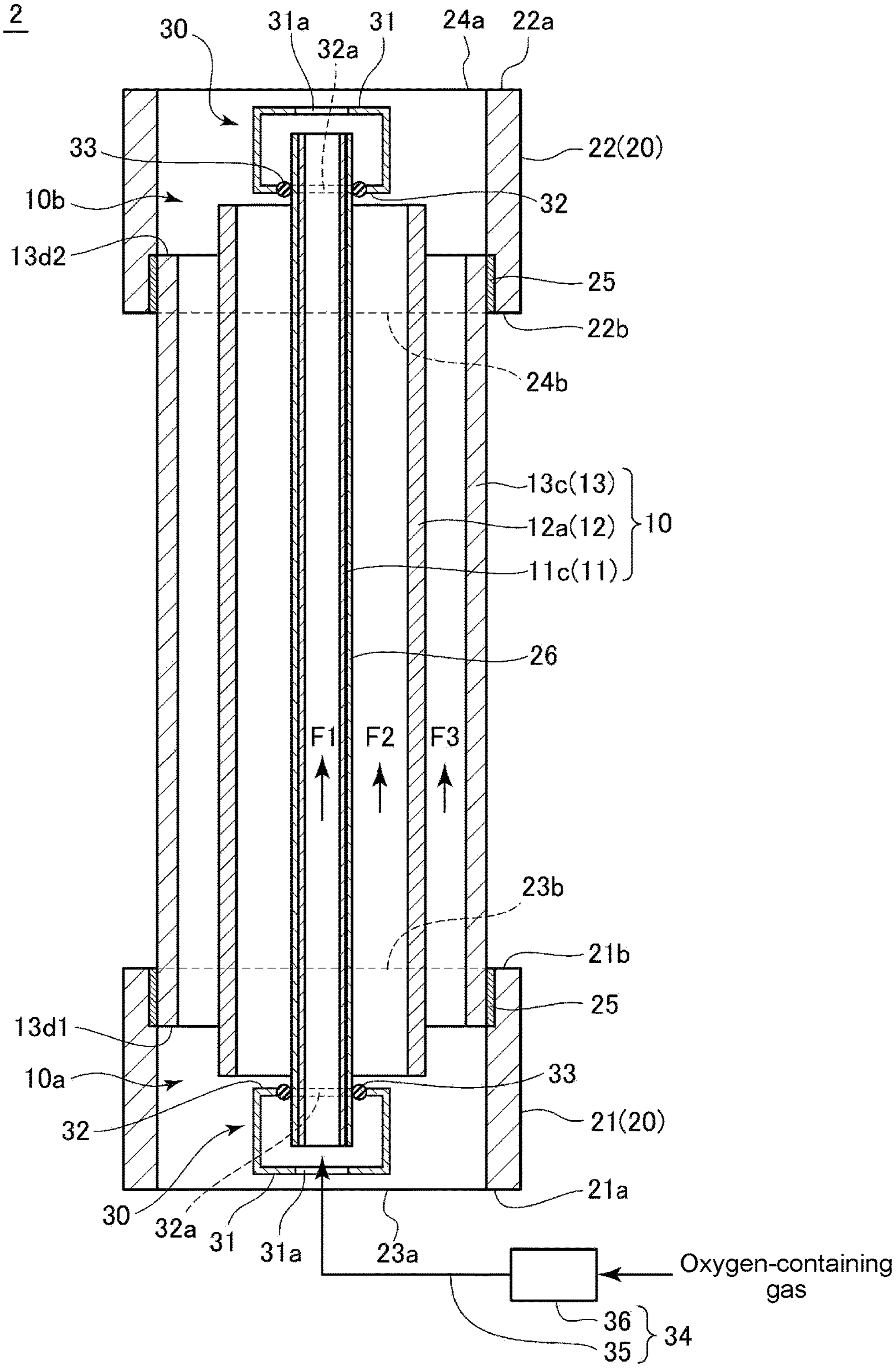
FIG. 5 is a cross-sectional schematic diagram showing the configuration of the three-electrode cell of the metal-air battery system according to Embodiment 3 of the present disclosure.

Configuration of Metal-Air Battery System According to Embodiment 3 of Present Disclosure As shown in FIG. 5, in Embodiment 3 of the present disclosure, the cell 2 includes the electrode device 10 with a discharging positive electrode 11*c* as the first electrode 11, the charging positive electrode 12*a* as the second electrode 12, and a negative electrode 13*c* as the third electrode 13. All of the discharging positive electrode 11*c*, the charging positive electrode 12*a*, and the negative electrode 13*c* have a tubular shape. An outer peripheral surface of the discharging positive electrode 11*c*, that is, a surface facing the negative electrode 13*c* is provided with the separation membrane 26. However, in Embodiment 3 (the same also applies to Embodiment 4 described later), a three-layer structure of the discharging positive electrode 11*c* is different from that of the discharging positive electrode 13*a* (see FIG. 2) of Embodiments 1 and 2, and the layer where the oxygen reduction catalyst is supported on the conductive material such as carbon is the outermost layer on the outer peripheral surface side and the porous layer in which oxygen can diffuse is the innermost layer on the inner peripheral surface side.

Each of the first chamber section 21 and the second chamber section 22 is internally provided with a separation member 30 for separating the flow of the electrolyte solution in the chamber 20 into a first flow F1 flowing inside the discharging positive electrode 11*c* and a second flow F2 flowing outside the discharging positive electrode 11*c*. The separation member 30 has a tubular shape in which end faces 31, 32 are disposed at both ends in the axial direction of the cell 2 when disposed inside the first chamber section 21 and the second chamber section 22, and openings 31*a*, 32*a* are respectively formed in the end faces 31, 32. The discharging positive electrode 11*c* is inserted into the one opening 32*a*, and a seal member 33 such as an O-ring is disposed between an inner peripheral edge of the opening 31*b* and an outer peripheral surface of the discharging positive electrode 11*c*. The other opening 31*a* faces the first opening 23*a* or the third opening 24*a*.

An oxygen-containing gas supply device 34 is provided to supply an oxygen-containing gas such as air to the electrolyte solution of the first flow F1 inside the separation member 30 disposed in, among the first chamber section 21 and the second chamber section 22, the first chamber section 21 located upstream in the flow direction of the electrolyte solution flowing in the cell 2. As the oxygen-containing gas supply device 34, it is possible to use, for example, a bubbling device that includes an oxygen-containing gas supply line 35 having one end located inside the separation member 30 and another end opening to the outside of the cell 2 or connected to an oxygen-containing gas cylinder or the like, and a compressor 36 disposed on the oxygen-containing gas supply line 35. Other configurations are the same as those in Embodiment 1.

Operation of Metal-Air Battery System According to Embodiment 3 of Present Disclosure Next, the operation of the metal-air battery system 1 according to Embodiment 3 will be described, focusing on differences from the operation of the metal-air battery system 1 according to Embodiment 1. When the metal-air battery system 1 is discharged, in the cell 2, the electrolyte solution having flowed into the first chamber section 21 via the first opening 23*a* is divided into the first flow F1 which is a flow of the electrolyte solution entering the inside of the separation member 30 via the opening 31*a* and the second flow F2 which is a flow of the electrolyte solution outside the separation member 30.

The oxygen-containing gas pressurized by the compressor 36 is supplied into the separation member 30 via the oxygen-containing gas supply line 35, thereby bubbling the oxygen-containing gas into the electrolyte solution. Consequently, the electrolyte solution in which oxygen is dissolved flows inside the discharging positive electrode 11*c* as the first flow F1. On the other hand, the electrolyte solution outside the separation member 30 flows, as the second flow F2, through a flow path formed between an outer peripheral surface of the discharging positive electrode 11*c* and the inner peripheral surface of the charging positive electrode 12*a* and a flow path formed between the outer peripheral surface of the charging positive electrode 12*a* and the inner peripheral surface of the negative electrode 13*c*.

The electrolyte solution of the first flow F1 flows out from the inside of the discharging positive electrode 11*c* to the inside of the separation member 30 disposed in the second chamber section 22, and flows out from the inside of the separation member 30 via the opening 31*a*. On the other hand, the electrolyte solution of the second flow F2 flows out to the second chamber section 22 via the second end portion 10*b* of the electrode device 10. The electrolyte solution where the first flow F1 and the second flow F2 join in the second chamber section 22 flows out from the second chamber section 22 via the third opening 24*a*. However, for the purpose of separating the gas contained in the first flow F1, the first flow F1 and the second flow F2 may flow out separately from the second chamber section 22 without being joined.

While the electrolyte solution thus flows in the cell 2, the same reactions as the reactions described in Embodiment 1 occur in the negative electrode 13*c* and the discharging positive electrode 11*c*. However, in Embodiment 3, oxygen contained in the electrolyte solution flowing through the discharging positive electrode 11*c* diffuses through the innermost layer and the intermediate layer of the discharging positive electrode 11*c*, and hydroxide ions are produced by reactions between the air, water in the electrolyte solution of the second flow F2, and electrons flowing to the discharging positive electrode 11*c* due to the oxygen reduction catalyst in the outermost layer. Other operations are the same as those of Embodiment 1, and technical effect obtained by providing the separation membrane 26 is also the same as that of Embodiment 1.

Embodiment 3 is the same as Embodiment 1 in that the discharging positive electrode 11*c*, the charging positive electrode 12*a*, and the negative electrode 13*c* are disposed such that their cross sections are concentric. Further, Embodiment 3 is the same as Embodiment 1 in that when the metal-air battery system 1 is charged, electrons flow to the negative electrode 13*c* and zinc ions in the electrolyte solution receive the electrons at the negative electrode 13*c*, thereby depositing zinc on the negative electrode 13*c*. Furthermore, Embodiment 3 is the same as Embodiment 1 in that when the metal-air battery system 1 is charged, even if the dendrite connecting the negative electrode 13*c* and the charging positive electrode 12*a* causes an internal short circuit, discharge using the negative electrode 13*c* and the discharging positive electrode 11*c* is possible. Therefore, Embodiment 3 can also obtain the same technical effect as the technical effect obtained in Embodiment 1.

In Embodiment 3, since the third electrode 13 arranged on the outermost side in the electrode device 10 is the negative electrode 13*c*, the area of the negative electrode relatively increases compared to a case where the first electrode 11 or the second electrode 12 is the negative electrode. Therefore, the amount of zinc deposited on the negative electrode 13*c* in Embodiment 3 increases compared to Embodiment 1, making it possible to increase an electricity storage capacity compared to Embodiment 1.

Figure 6:
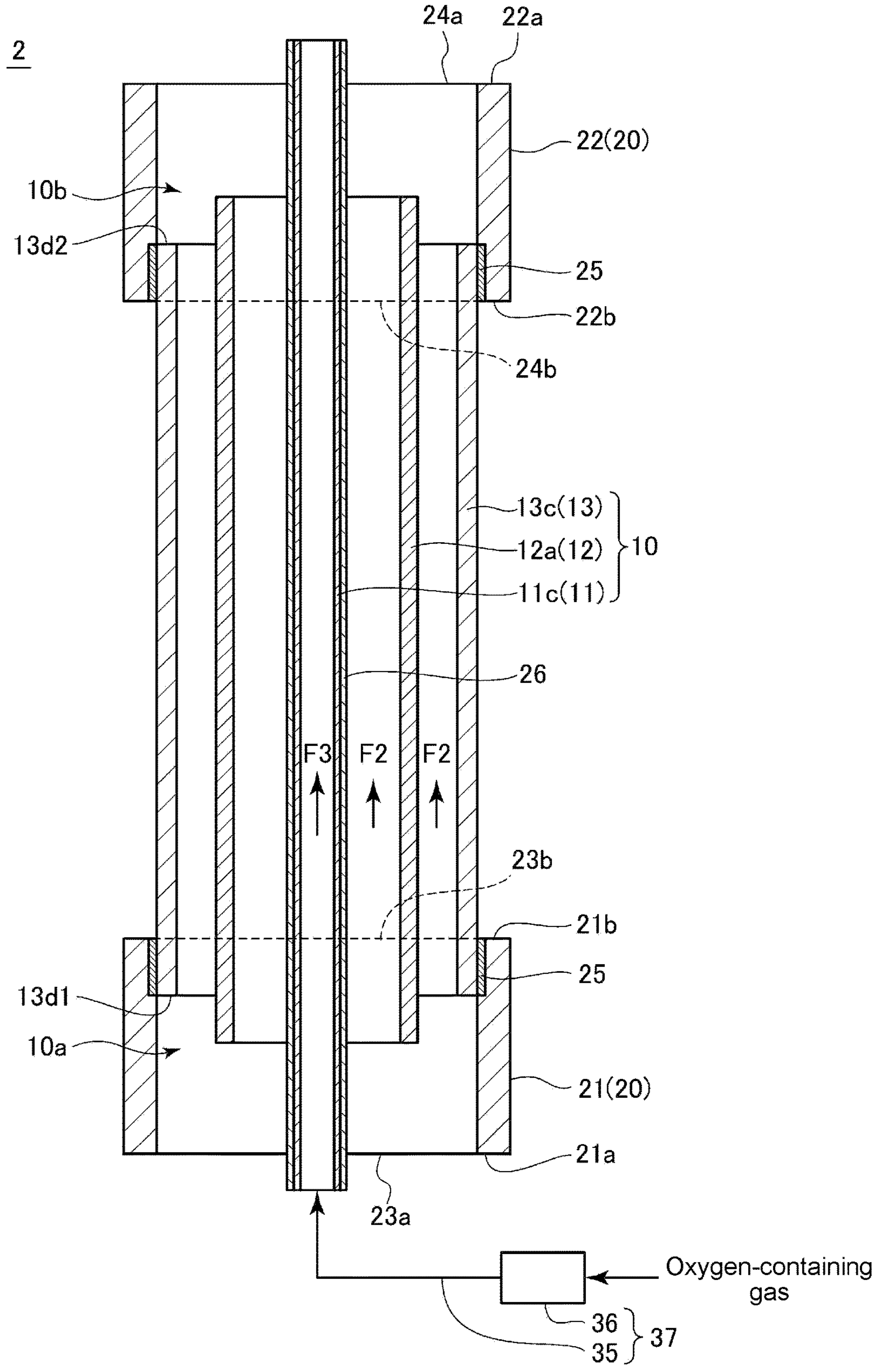
FIG. 6 is a cross-sectional schematic diagram showing the configuration of the three-electrode cell of a modified example of the metal-air battery system according to Embodiment 3 of the present disclosure.

Modified Example of Metal-Air Battery System According to Embodiment 3 of Present Disclosure As shown in FIG. 6, in the cell 2 in the modified example of the metal-air battery system 1 according to Embodiment 3, only the discharging positive electrode 11*c* of the electrode device 10 is inserted into the first opening 23*a* and the third opening 24*a*. That is, both ends of the discharging positive electrode 11*c* extend from the first opening 23*a* and the third opening 24*a* to the outside the first chamber section 21 and the second chamber section 22. A downstream end of the oxygen-containing gas supply line 35 is connected to an end portion of the discharging positive electrode 11*c* extending from the first opening 23*a* to the outside of the first chamber section 21. Other configurations are the same as those in Embodiment 3, except the separation member 30 (see FIG. 4) is not provided.

In this modified example of Embodiment 3, separated from the second flow F2, an oxygen-containing gas flow F3 flows inside the discharging positive electrode 11*c*. Also in this form, while the electrolyte solution and the oxygen-containing gas circulate in the cell 2, discharge is performed by the same reaction as in Embodiment 3. Further, the charging operation is also the same as in Embodiment 3. Therefore, also in this modified example, the same technical effect as in Embodiment 3 can be obtained.

Figure 7:
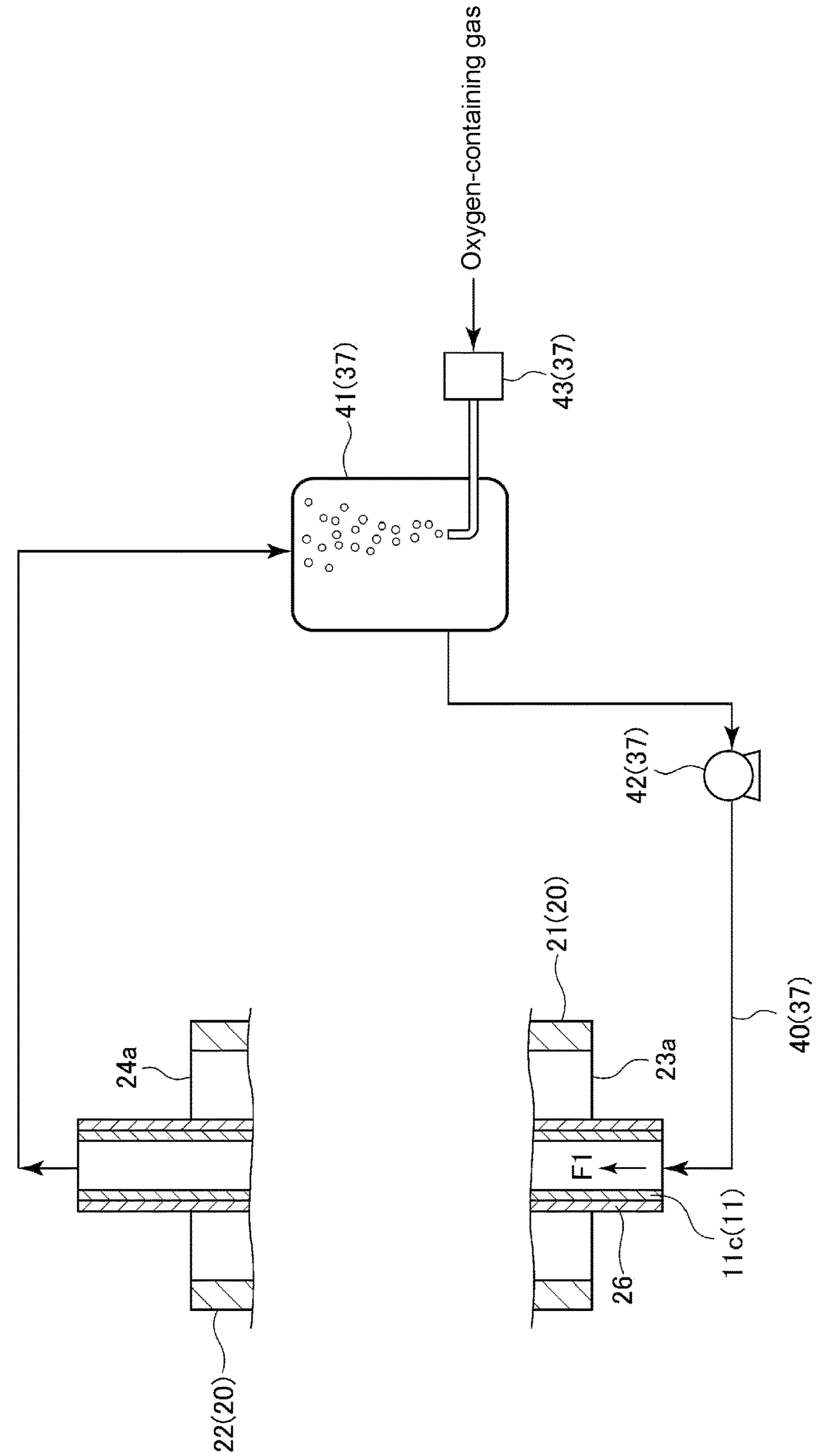
FIG. 7 is a schematic configuration diagram showing part of another modified example of the metal-air battery system according to Embodiment 3 of the present disclosure.

In this modified example of Embodiment 3, the oxygen-containing gas is flowed inside the discharging positive electrode 11*c*, but the present disclosure is not limited to this form. As shown in FIG. 7, the electrolyte solution in which oxygen is dissolved may be flowed inside the discharging positive electrode 11*c* as the first flow F1. In this form, the both ends of the discharging positive electrode 11*c* are connected to both ends of a circulation line 40 where the electrolyte solution circulates. The circulation line 40 includes an electrolytic tank 41 for storing the electrolyte solution, and a pump 42. The circulation line 40, the electrolytic tank 41, and the pump 42 are disposed separately from the circulation line 3 (see FIG. 1), the electrolytic tank 4 (see FIG. 1), and the pump 5 (see FIG. 1), respectively.

The electrolytic tank 41 is provided with a bubbling device 43 for supplying an oxygen-containing gas into the electrolyte solution stored in the electrolytic tank 41 while bubbling the oxygen-containing gas. Whereby, the electrolyte solution of the first flow F1 can be an electrolyte solution in which oxygen is dissolved. Thus, in the modified example of Embodiment 3, either the gas containing oxygen or the electrolyte solution containing oxygen may flow inside the discharging positive electrode 11*c*. That is, a fluid containing oxygen can be flowed inside the discharging positive electrode 11*c*. In this modified example, the configuration including the oxygen-containing gas supply line 35 and the compressor 36 or the configuration including the circulation line 40, the electrolytic tank 41, the pump 42, and the bubbling device 43 is an oxygen-containing fluid supply device 37 for flowing, inside the discharging positive electrode 11*c*, the fluid containing oxygen.

Embodiment 4

Next, the metal-air battery system according to Embodiment 4 will be described. The metal-air battery system according to Embodiment 4 is obtained by modifying the configuration of the electrode device 10 with respect to Embodiment 3. In Embodiment 4, the same constituent elements as those in Embodiment 3 are associated with the same reference signs and not described again in detail.

Figure 8:
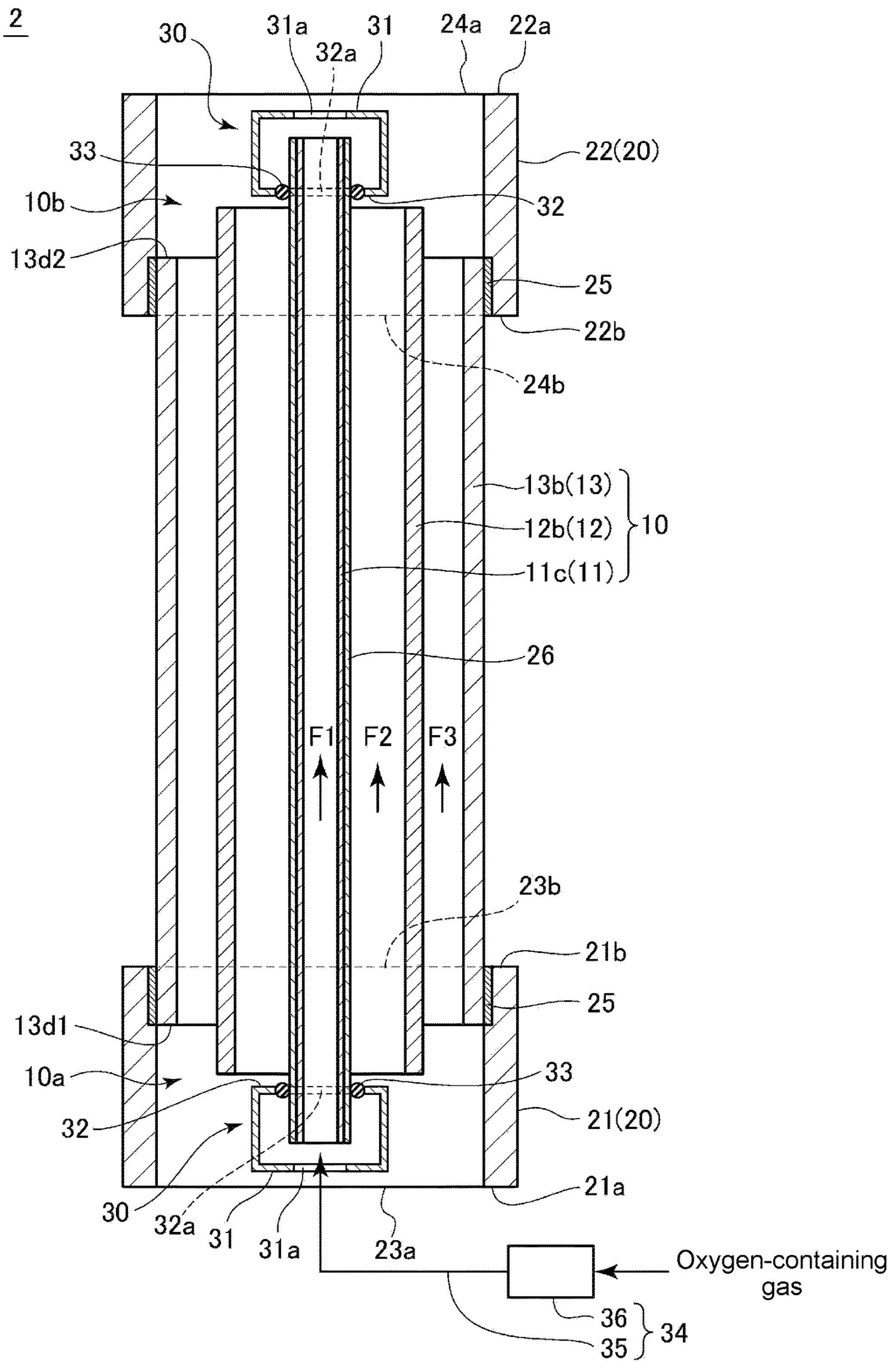
FIG. 8 is a cross-sectional schematic diagram showing the configuration of the three-electrode cell of the metal-air battery system according to Embodiment 4 of the present disclosure.

Configuration of Metal-Air Battery System According to Embodiment 4 of Present Disclosure As shown in FIG. 8, in Embodiment 3 of the present disclosure, the cell 2 includes the electrode device 10 with the discharging positive electrode 11*c* as the first electrode 11, the negative electrode 12*b* as the second electrode 12, and a charging positive electrode 13*b* as the third electrode 13. All of the discharging positive electrode 11*c*, the negative electrode 12*b*, and the charging positive electrode 13*b* have a tubular shape. In Embodiment 4, the charging positive electrode 13*b* will be described not as an electrode having a tubular shape manufactured in a mesh shape as in Embodiment 1 but as an electrode having a non-mesh tubular shape. Other configurations are the same as those in Embodiment 3.

<Operation of Metal-Air Battery System According to Embodiment 4 of Present Disclosure Since the operation of Embodiment 4 and the operation of Embodiment 3 are the same, the same technical effect as in Embodiment 3 can be obtained. Further, in Embodiment 4 as well, since the charging positive electrode 11*b*, the negative electrode 12*b*, and the discharging positive electrode 13*a* are disposed such that their cross sections are concentric, the same technical effect as in Embodiment 1 can be obtained.

As in Embodiment 2, in Embodiment 4 as well, a measuring instrument is provided to measure a potential difference between the negative electrode 12*b* and the discharging positive electrode 11*c*, and this potential difference is monitored during charging, making it possible to detect that internal short circuit has occurred between the negative electrode 12*b* and the discharging positive electrode 11*c*. If the internal short circuit between the negative electrode 12*b* and the discharging positive electrode 11*c* is detected, the internal short circuit can be eliminated by discharging using the negative electrode 12*b* and the charging positive electrode 13*b*.

Figure 9:
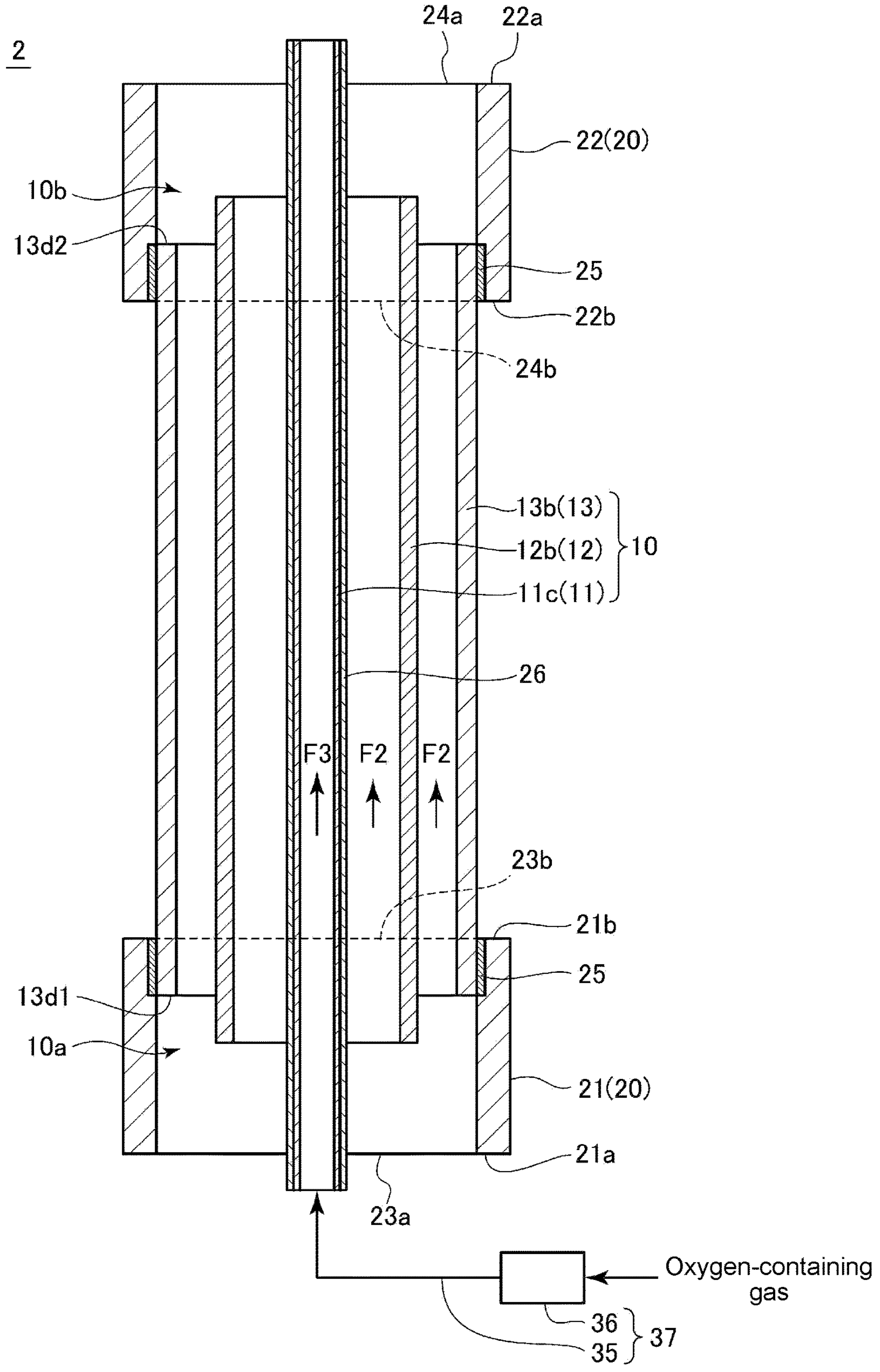
FIG. 9 is a cross-sectional schematic diagram showing the configuration of the three-electrode cell of a modified example of the metal-air battery system according to Embodiment 4 of the present disclosure.

Modified Example of Metal-Air Battery System According to Embodiment 4 of Present Disclosure In Embodiment 4 as well, as in Embodiment 3, a modified example is possible in which, instead of the first flow F1 of the electrolyte solution flowing inside the discharging positive electrode 11*c*, the oxygen-containing gas flow F3 is used as shown in FIG. 9. Further, by applying the configuration shown in FIG. 7 to this modified example, the electrolyte solution in which oxygen is dissolved can also be used as the first flow F1. Furthermore, when the mesh charging positive electrode 13*b* is used in Embodiment 4, the separation membrane 26 is also disposed on the inner peripheral surface of the charging positive electrode 13*b*, making it possible to suppress leakage of the electrolyte solution from the cell 2 via the charging positive electrode 13*b*.

Embodiment 5

Next, the metal-air battery system according to Embodiment 5 will be described. The metal-air battery system according to Embodiment 5 is obtained by modifying the configuration of the electrode device 10 with respect to Embodiment 1. In Embodiment 5, the same constituent elements as those in Embodiment 1 are associated with the same reference signs and not described again in detail.

Figure 10:
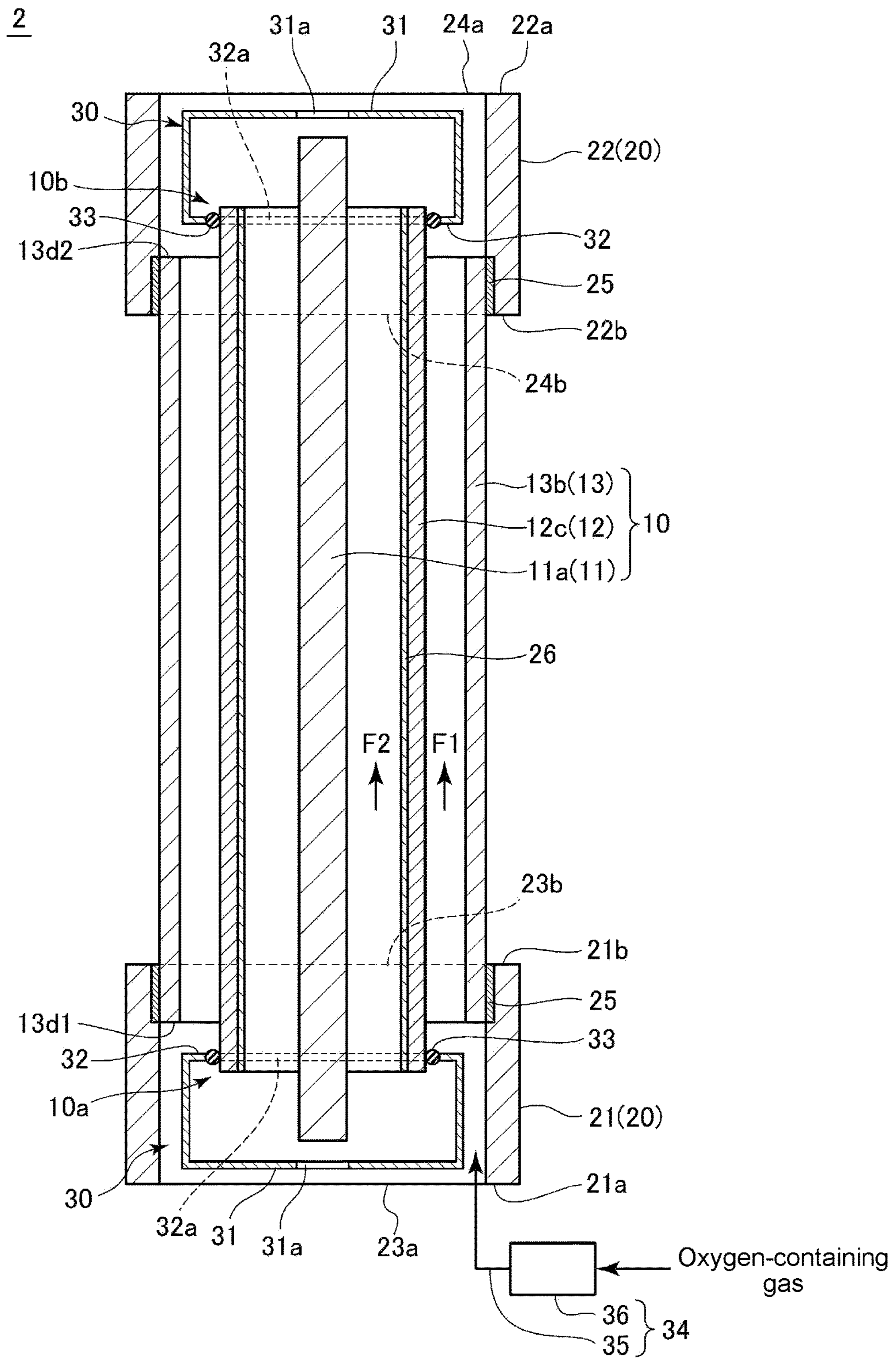
FIG. 10 is a cross-sectional schematic diagram showing the configuration of the three-electrode cell of the metal-air battery system according to Embodiment 5 of the present disclosure.

Configuration of Metal-Air Battery System According to Embodiment 5 of Present Disclosure As shown in FIG. 10, in Embodiment 5 of the present disclosure, the cell 2 includes the electrode device 10 with the negative electrode 11*a* as the first electrode 11, a discharging positive electrode 12*c* as the second electrode 12, and the charging positive electrode 13*b* as the third electrode 13. An inner peripheral surface of the discharging positive electrode 12*c*, that is, a surface facing the negative electrode 11*a* is provided with the separation membrane 26.

Each of the first chamber section 21 and the second chamber section 22 is internally provided with the separation member 30 for separating the flow of the electrolyte solution in the chamber 20 into the first flow F1 flowing through a flow path between an outer peripheral surface of the discharging positive electrode 12*c* and the inner peripheral surface of the charging positive electrode 13*b*, and the second flow F2 flowing through a flow path between the outer peripheral surface of the negative electrode 11*a* and the inner peripheral surface of the discharging positive electrode 12*c*. The separation member 30 has the tubular shape in which the end faces 31, 32 are disposed at the both ends in the axial direction of the cell 2 when disposed inside the first chamber section 21 and the second chamber section 22, and the openings 31*a*, 32*a* are respectively formed in the end faces 31, 32. The discharging positive electrode 12*c* is inserted into the one opening 32*a*, and the seal member 33 such as the O-ring is disposed between the inner peripheral edge of the opening 32*a* and the outer peripheral surface of the discharging positive electrode 12*c*. The other opening 31*a* faces the first opening 23*a* or the third opening 24*a*.

The oxygen-containing gas supply device 34 is provided to supply the oxygen-containing gas such as air to the electrolyte solution of the first flow F1 outside the separation member 30 disposed in, among the first chamber section 21 and the second chamber section 22, the first chamber section 21 located upstream in the flow direction of the electrolyte solution flowing in the cell 2. The configuration of the oxygen-containing gas supply device 34 in Embodiment 5 is the same as in Embodiment 3. Other configurations are the same as those in Embodiment 1.

Operation of Metal-Air Battery System According to Embodiment 5 of Present Disclosure The description of the operation of Embodiment 3 applies to the operation of the metal-air battery system 1 according to Embodiment 5, except that the first flow F1 is the flow flowing through the flow path between the outer peripheral surface of the discharging positive electrode 12*c* and the inner peripheral surface of the charging positive electrode 13*b* and the second flow F2 is the flow flowing through the flow path between the outer peripheral surface of the negative electrode 11*a* and the inner peripheral surface of the discharging positive electrode 12*c*. Therefore, Embodiment 5 can also obtain the same technical effect as the technical effect obtained in Embodiment 3. Further, in Embodiment 5 as well, since the negative electrode 11*a*, the discharging positive electrode 12*c*, and the charging positive electrode 13*b* are disposed such that their cross sections are concentric, the same technical effect as the technical effect obtain in Embodiment 1 can be obtained.

In Embodiment 5, since the first electrode 11 is the negative electrode 11*a* and the third electrode 13 is the charging positive electrode 13*b*, a distance between the negative electrode 11*a* and the charging positive electrode 13*b* is large compared to Embodiments 1 to 4. Therefore, in Embodiment 5, an internal short circuit is less likely to occur when the metal-air battery system 1 is charged, compared to Embodiments 1 to 4.

As in Embodiments 2 and 4, in Embodiment 5 as well, a measuring instrument is provided to measure a potential difference between the negative electrode 11*a* and the discharging positive electrode 12*c*, and this potential difference is monitored during charging, making it possible to detect that internal short circuit has occurred between the negative electrode 11*a* and the discharging positive electrode 12*c*. If the internal short circuit between the negative electrode 11*a* and the discharging positive electrode 12*c* is detected, the internal short circuit can be eliminated by discharging using the negative electrode 11*a* and the charging positive electrode 13*b*.

In Embodiment 5, since the separation membrane 26 is disposed on the inner peripheral surface of the discharging positive electrode 12*c*, it is possible to prevent oxygen contained in the electrolyte solution of the first flow F1 from moving to the electrolyte solution of the second flow F2 via the discharging positive electrode 12*c*. Whereby, it is possible to suppress formation of a high-resistivity layer of zinc oxide in the electrolyte solution of the second flow F2.

Modified Example of Metal-Air Battery System According to Embodiment 5 of Present Disclosure Further, when the mesh charging positive electrode 13*b* is also used in Embodiment 5, the separation membrane 26 is also disposed on the inner peripheral surface of the charging positive electrode 13*b*, making it possible to suppress leakage of the electrolyte solution from the cell 2 via the charging positive electrode 13*b*.

Embodiment 6

Next, the metal-air battery system according to Embodiment 6 will be described. The metal-air battery system according to Embodiment 6 is obtained by modifying the configuration of the electrode device 10 with respect to Embodiment 5. In Embodiment 6, the same constituent elements as those in Embodiment 5 are associated with the same reference signs and not described again in detail.

Figure 11:
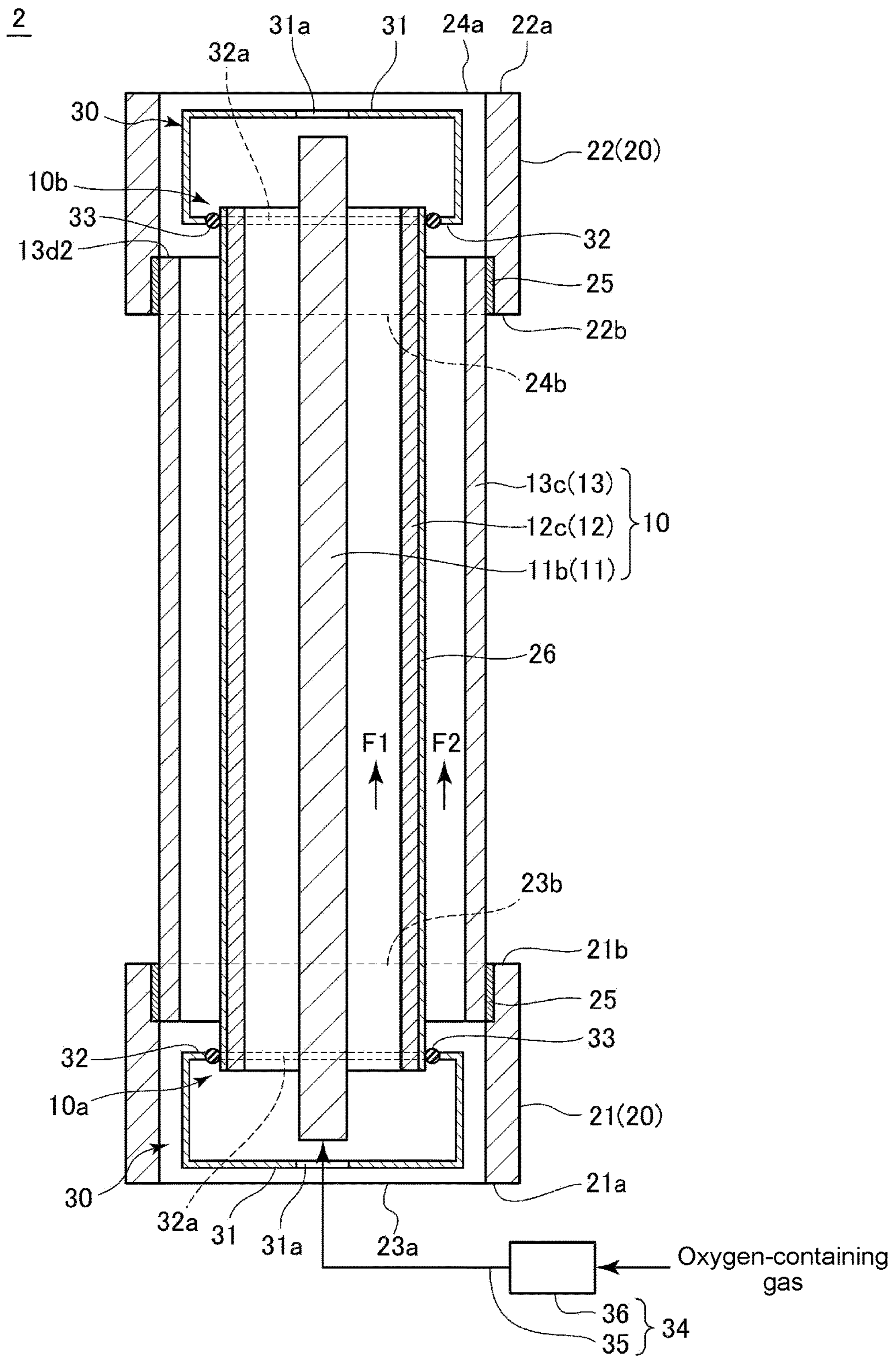
FIG. 11 is a cross-sectional schematic diagram showing the configuration of the three-electrode cell of the metal-air battery system according to Embodiment 6 of the present disclosure.

Configuration of Metal-Air Battery System According to Embodiment 6 of Present Disclosure As shown in FIG. 11, in Embodiment 6 of the present disclosure, the cell 2 includes the electrode device 10 with the charging positive electrode 11*b* as the first electrode 11, the discharging positive electrode 12*c* as the second electrode 12, and the negative electrode 13*c* as the third electrode 13. An outer peripheral surface of the discharging positive electrode 12*c*, that is, a surface facing the negative electrode 13*c* is provided with the separation membrane 26. The three-layer structure of the discharging positive electrode 12*c* is the same as the three-layer structure of the discharging positive electrode 11*c* (see FIG. 5) of Embodiments 3 and 4.

Each of the first chamber section 21 and the second chamber section 22 is internally provided with the separation member 30 for separating the flow of the electrolyte solution in the chamber 20 into the first flow F1 flowing through a flow path between the outer peripheral surface of the charging positive electrode 11*b* and the inner peripheral surface of the discharging positive electrode 12*c*, and the second flow F2 flowing through a flow path between the outer peripheral surface of the discharging positive electrode 12*c* and the inner peripheral surface of the negative electrode 13*c*. The oxygen-containing gas supply device 34 is provided to supply the oxygen-containing gas such as air to the electrolyte solution of the first flow F1 inside the separation member 30 disposed in, among the first chamber section 21 and the second chamber section 22, the first chamber section 21 located upstream in the flow direction of the electrolyte solution flowing in the cell 2. Other configurations are the same as those in Embodiment 5.

Operation of Metal-Air Battery System According to Embodiment 6 of Present Disclosure As in Embodiment 5, the description of the operation of Embodiment 3 applies to the operation of the metal-air battery system 1 according to Embodiment 6, except that the first flow F1 is the flow flowing through the flow path the outer peripheral surface of the charging positive electrode 11*b* and the inner peripheral surface of the discharging positive electrode 12*c* and the second flow F2 is the flow flowing through the flow path between the outer peripheral surface of the discharging positive electrode 12*c* and the inner peripheral surface of the negative electrode 13*c*. Therefore, Embodiment 6 can also obtain the same technical effect as the technical effect obtained in Embodiment 3. Further, in Embodiment 6 as well, since the charging positive electrode 11*b*, the discharging positive electrode 12*c*, and the negative electrode 13*c* are disposed such that their cross sections are concentric, the same technical effect as the technical effect obtain in Embodiment 1 can be obtained.

As in Embodiment 5, in Embodiment 6 as well, since the first electrode 11 is the charging positive electrode 11*b* and the third electrode 13 is the negative electrode 13*c*, a distance between the charging positive electrode 11*b* and the negative electrode 13*c* is large compared to Embodiments 1 to 4. Therefore, in Embodiment 6, an internal short circuit is less likely to occur when the metal-air battery system 1 is charged, compared to Embodiments 1 to 4.

In Embodiment 6, since the third electrode 13 arranged on the outermost side in the electrode device 10 is the negative electrode 13*c*, the area of the negative electrode relatively increases compared to a case where the first electrode 11 or the second electrode 12 is the negative electrode. Therefore, the amount of zinc deposited on the negative electrode 13*c* in Embodiment 6 increases compared to Embodiment 1, making it possible to increase the electricity storage capacity compared to Embodiment 1.

As in Embodiment 5, in Embodiment 6 as well, a measuring instrument is provided to measure a potential difference between the negative electrode 13*c* and the discharging positive electrode 12*c*, and this potential difference is monitored during charging, making it possible to detect that internal short circuit has occurred between the negative electrode 13*c* and the discharging positive electrode 12*c*. If the internal short circuit between the negative electrode 13*c* and the discharging positive electrode 12*c* is detected, the internal short circuit can be eliminated by discharging using the negative electrode 13*c* and the charging positive electrode 11*b*.

In Embodiment 6, since the separation membrane 26 is disposed on the outer peripheral surface of the discharging positive electrode 12*c*, it is possible to prevent oxygen contained in the electrolyte solution of the first flow F1 from moving to the electrolyte solution of the second flow F2 via the discharging positive electrode 12*c*. Whereby, it is possible to suppress formation of a high-resistivity layer of zinc oxide in the electrolyte solution of the second flow F2.

The contents described in the above embodiments would be understood as follows, for instance.

[1] A metal-air battery system according to one aspect is a metal-air battery system (1) that includes a cell (2) including: a chamber (20); and an electrode device (10) housed in the chamber (20). The electrode device (10) includes: a first electrode (11); a tubular second electrode (12) disposed so as to surround the first electrode (11) on a radially outer side of the first electrode (11); and a tubular third electrode (13) disposed so as to surround the second electrode (12) on a radially outer side of the second electrode (12), and is configured such that an electrolyte solution flows at least between an outer peripheral surface of the first electrode (11) and an inner peripheral surface of the third electrode (13). A combination of the first electrode (11), the second electrode (12), and the third electrode (13) is a combination of a negative electrode (11*a*, 12*b*, 13*c*) containing metal, a charging positive electrode (11*b*, 12*a*, 13*b*), and a discharging positive electrode (11*c*, 12*c*, 13*a*).

According to the metal-air battery system of the present disclosure, since the difference in electrode area between the inner side and the outer side can be obtained by arranging the electrodes such that their cross sections are concentric, it is possible to reduce the current density during operation of the electrodes arranged on the outer side compared to that of the central electrode. The resistance of the system can be reduced by utilizing this effect to arrange, on the outer side, the electrodes requiring a reduction in resistance loss, making it possible to efficiently charge/discharge. Further, since the electrolyte solution is supplied in circulation to the cell, electricity can be stored.

[2] A metal-air battery system according to another aspect is the metal-air battery system of [1], further including a switching device (7) for switching such that the negative electrode (11*a*, 12*b*, 13*c*) is electrically connected to either the charging positive electrode (11*b*, 12*a*, 13*b*) or the discharging positive electrode (11*c*, 12*c*, 13*a*). The switching device (7) includes: a first switch (7*c*) for electrically opening and closing between the discharging positive electrode (11*c*, 12*c*, 13*a*) and the negative electrode (11*a*, 12*b*, 13*c*); and a second switch (7*d*) for electrically opening and closing between the negative electrode (11*a*, 12*b*, 13*c*) and the charging positive electrode (11*b*, 12*a*, 13*b*).

With such configuration, since the negative electrode and the charging positive electrode are used to charge and the negative electrode and the discharging positive electrode are used to discharge, it is possible to discharge even if internal short circuit occurs during charging. Whereby, it is possible to charge/discharge without any trouble. Further, it is possible to reduce the risk of opposite reactions occurring at the positive electrode during charging and discharging, and improvements in efficiency and lifetime can be expected.

[3] A metal-air battery system according to still another aspect is the metal-air battery system of [2], wherein the switching device (7) includes a first diode (7*a*) for flowing a current in a direction from the discharging positive electrode (11*c*, 12*c*, 13*a*) to the negative electrode (11*a*, 12*b*, 13*c*).

With such configuration, in a state where the charging positive electrode is immersed in the electrolyte solution, it is possible to reduce the risk of opposite reactions occurring at the positive electrode during charging and discharging, and improvements in efficiency and lifetime can be expected. Further, compared to the switching device in the above [2], it is possible to configure a switching device which is superior in durability and low in cost.

[4] A metal-air battery system according to yet another aspect is the metal-air battery system of [3], wherein the switching device (7) further includes a second diode (7*ba*) for flowing the current in a direction from the negative electrode (11*a*, 12*b*, 13*c*) to the charging positive electrode (11*b*, 12*a*, 13*b*).

With such configuration, it is possible to reduce the risk of opposite reactions occurring at the positive electrode during charging and discharging, and improvements in efficiency and lifetime can be expected. Further, compared to the switching device in the above [2], it is possible to configure a switching device which is superior in durability and low in cost.

[5] A metal-air battery system according to yet another aspect is the metal-air battery system of any of [1] to [4], wherein the electrode device (10) has a shape extending in an axial direction, and includes a first end portion (10*a*) which is one end portion in the axial direction and a second end portion (10*b*) which is another end portion in the axial direction, wherein the chamber (20) includes: a first chamber section (21) disposed so as to internally house at least one end portion (13*d*1) of the third electrode (13) on a side of the first end portion (10*a*) of the electrode device (10); and a second chamber section (22) disposed so as to internally house at least another end portion (13*d*2) of the third electrode (13) on a side of the second end portion (10*b*) of the electrode device (10), wherein the first chamber section (21) has a first end face (21*a*) and a second end face (21*b*) located away from each other in the axial direction, and the first end face (21*a*) and the second end face (21*b*) are respectively formed with a first opening (23*a*) and a second opening (23*b*), wherein the second chamber section (22) has a third end face (22*a*) and a fourth end face (22*b*) located away from each other in the axial direction, and the third end face (22*a*) and the fourth end face (22*b*) are respectively formed with a third opening (24*a*) and a fourth opening (24*b*), and wherein the first electrode (11), the second electrode (12), and the third electrode (13) forming the electrode device (10) are respectively inserted into the second opening (23*b*) and the fourth opening (24*b*), and a seal member (25) for sealing between an outer peripheral surface of the third electrode (13) and respective inner peripheral surfaces of the first chamber section (21) and the second chamber section (22) is disposed therebetween.

With such configuration, since the seal member disposed between the outer peripheral surface of the third electrode and the respective inner peripheral surfaces of the first chamber and the second chamber seals therebetween, it is possible to suppress leakage of the electrolyte solution from the chamber between the first opening and the third opening.

[6] A metal-air battery system according to yet another aspect is the metal-air battery system of [5], wherein the third electrode (13) is the discharging positive electrode (13*a*).

With such configuration, even if a short circuit occurs between the negative electrode and the charging positive electrode during charging, it is possible to discharge between the negative electrode and the discharging positive electrode.

[7] A metal-air battery system according to yet another aspect is the metal-air battery system of [5], wherein the first electrode (11) is the discharging positive electrode (11*c*) having a tubular shape, wherein each of the first chamber section (21) and the second chamber section (22) is internally provided with a separation member (30) for separating a flow of the electrolyte solution in the chamber (20) into a first flow (F1) flowing inside the discharging positive electrode (11*c*) and a second flow (F2) flowing outside the discharging positive electrode (11*c*), and wherein the metal-air battery system further includes an oxygen-containing gas supply device (34) for supplying an oxygen-containing gas to the electrolyte solution of the first flow (F1).

With such configuration, even if a short circuit occurs between the negative electrode and the charging positive electrode during charging, it is possible to discharge between the negative electrode and the discharging positive electrode.

[8] A metal-air battery system according to yet another aspect is the metal-air battery system of [5], wherein the first electrode (11) is the discharging positive electrode (11*c*) having a tubular shape, wherein only the discharging positive electrode (11*c*) of the electrode device (10) is inserted into the first opening (23*a*) and the third opening (24*a*), and wherein an oxygen-containing fluid supply device (37) is provided to flow, inside the discharging positive electrode (11*c*), a fluid containing oxygen.

With such configuration, even if a short circuit occurs between the negative electrode and the charging positive electrode during charging, it is possible to discharge between the negative electrode and the discharging positive electrode.

[9] A metal-air battery system according to yet another aspect is the metal-air battery system of [7] or [8], wherein the second electrode (12) is the charging positive electrode (12*a*), and the third electrode (13) is the negative electrode (13*c*).

With such configuration, the area of the negative electrode relatively increases compared to a case where the first electrode or the second electrode is the negative electrode. Therefore, the amount of metal deposited on the negative electrode increases, making it possible to increase the electricity storage capacity.

[10] A metal-air battery system according to yet another aspect is the metal-air battery system of [7] or [8], wherein the second electrode (12) is the negative electrode (12*b*), and the third electrode (13) is the charging positive electrode (13*b*).

With such configuration, an internal short circuit between the negative electrode and the charging positive electrode can be detected in advance by monitoring the voltage between the negative electrode and the discharging positive electrode.

[11] A metal-air battery system according to yet another aspect is the metal-air battery system of [5], wherein the second electrode (12) is the discharging positive electrode (12*c*), wherein each of the first chamber section (21) and the second chamber section (22) is internally provided with a separation member (30) for separating a flow of the electrolyte solution in the chamber (20) into a first flow (F1) flowing between the charging positive electrode (11*b*, 13*b*) and the discharging positive electrode (12*c*), and a second flow (F2) flowing between the discharging positive electrode (12*c*) and the negative electrode (11*a*, 13*c*), and wherein the metal-air battery system (1) further includes an oxygen-containing gas supply device (34) for supplying an oxygen-containing gas to the electrolyte solution of the first flow (F1).

With such configuration, the distance between the negative electrode and the charging positive electrode increases compared to the configuration where the negative electrode and the charging positive electrode are adjacent to each other, making it unlikely to cause an internal short circuit between the negative electrode and the charging positive electrode. However, even if the internal short circuit occurs during charging, it is possible to discharge between the negative electrode and the discharging positive electrode. Further, the internal short circuit between the negative electrode and the charging positive electrode can be detected in advance by monitoring the voltage between the negative electrode and the discharging positive electrode.

[12] A metal-air battery system according to yet another aspect is the metal-air battery system of [11], wherein the first electrode (11) is the charging positive electrode (11*b*), and the third electrode (13) is the negative electrode (13*c*).

With such configuration, the area of the negative electrode relatively increases compared to a case where the first electrode or the second electrode is the negative electrode. Therefore, the amount of metal deposited on the negative electrode increases, making it possible to increase the electricity storage capacity.

[13] A metal-air battery system according to yet another aspect is the metal-air battery system of [11], wherein the first electrode (11) is the negative electrode (11*a*), and the third electrode (13) is the charging positive electrode (13*b*).

With such configuration, since the difference in electrode area between the inner side and the outer side can be obtained by arranging electrodes such that their cross sections are concentric, it is possible to reduce the current density during operation of the electrodes arranged on the outer side compared to that of the central electrode. The resistance of the system can be reduced by utilizing this effect to arrange, on the outer side, the electrodes requiring a reduction in resistance loss, making it possible to efficiently charge/discharge. Further, since the electrolyte solution is supplied in circulation to the cell, electricity can be stored.

[14] A metal-air battery system according to yet another aspect is the metal-air battery system of any of [1] to [13], wherein the discharging positive electrode (11*c*, 12*c*, 13*a*) includes a separation membrane (26) on a surface facing the negative electrode (11*a*, 12*b*, 13*c*).

With such configuration, depending on the respective positions of the negative electrode, the charging positive electrode, and the discharging positive electrode, it is possible to achieve any of the reduction in loss of the overvoltage of the reaction in the discharging positive electrode, suppression of the alteration and deterioration in the electrolyte solution, suppression of leakage of the electrolyte solution from the discharging positive electrode, and suppression of formation of the high-resistivity layer due to contact between the negative electrode and the oxygen-containing gas.

REFERENCE SIGNS LIST

1 Metal-air battery system
2 Cell
7 Switching device
7*a* First diode
7*b* Second diode
7*c* First switch
7*d* Second switch
10 Electrode device
10*a* First end portion
10*b* Second end portion
11 First electrode
11*a* Negative electrode
11*b* Charging positive electrode
11*c* Discharging positive electrode
12 Second electrode
12*a* Charging positive electrode
12*b* Negative electrode
12*c* Discharging positive electrode
13 Third electrode
13*a* Discharging positive electrode
13*b* Charging positive electrode
13*c* Negative electrode
13*d*1 One end portion (of third electrode)
13*d*2 Another end portion (of third electrode)
20 Chamber
21 First chamber section
21*a* First end face
21*b* Second end face
22 Second chamber section
22*a* Third end face
22*b* Fourth end face
23*a* First opening
23*b* Second opening
24*a* Third opening
24*b* Fourth opening
25 Seal member
26 Separation wall
30 Separation member
34 Oxygen-containing gas supply device
37 Oxygen-containing fluid supply device
F1 First flow
F2 Second flow

The invention claimed is:

1. A metal-air battery system, comprising:

a cell including:

a chamber; and an electrode device housed in the chamber, wherein the electrode device includes:

a first electrode;

a tubular second electrode disposed so as to surround the first electrode on a radially outer side of the first electrode; and a tubular third electrode disposed so as to surround the second electrode on a radially outer side of the second electrode, and is configured such that an electrolyte solution flows at least between an outer peripheral surface of the first electrode and an inner peripheral surface of the third electrode, a combination of the first electrode, the second electrode, and the third electrode is a combination of a negative electrode containing metal, a charging positive electrode, and a discharging positive electrode, the electrode device has a shape extending in an axial direction, and includes a first end portion which is one end portion in the axial direction and a second end portion which is another end portion in the axial direction, the chamber includes:

a first chamber section disposed so as to internally house at least one end portion of the third electrode on a side of the first end portion of the electrode device; and a second chamber section disposed so as to internally house at least another end portion of the third electrode on a side of the second end portion of the electrode device, the first chamber section has a first end face and a second end face located away from each other in the axial direction, and the first end face and the second end face are respectively formed with a first opening and a second opening, the second chamber section has a third end face and a fourth end face located away from each other in the axial direction, and the third end face and the fourth end face are respectively formed with a third opening and a fourth opening, and the first electrode, the second electrode, and the third electrode forming the electrode device are inserted into each of the second opening and the fourth opening, and a seal member for sealing between an outer peripheral surface of the third electrode and respective inner peripheral surfaces of the first chamber section and the second chamber section is disposed therebetween.

2. The metal-air battery system according to claim 1, further comprising:

a switching device for switching such that the negative electrode is electrically connected to either the charging positive electrode or the discharging positive electrode, wherein the switching device includes:

a first switch for electrically opening and closing between the discharging positive electrode and the negative electrode; and a second switch for electrically opening and closing between the negative electrode and the charging positive electrode.

3. The metal-air battery system according to claim 1, further comprising:

a switching device for switching such that the negative electrode is electrically connected to either the charging positive electrode or the discharging positive electrode, wherein the switching device includes a first diode for flowing a current in a direction from the discharging positive electrode to the negative electrode.

4. The metal-air battery system according to claim 3, wherein the switching device further includes a second diode for flowing the current in a direction from the negative electrode to the charging positive electrode.

5. The metal-air battery system according to claim 1, wherein the third electrode is the discharging positive electrode.

6. The metal-air battery system according to claim 1, wherein the first electrode is the discharging positive electrode having a tubular shape, each of the first chamber section and the second chamber section is internally provided with a separation member for separating a flow of the electrolyte solution in the chamber into a first flow flowing inside the discharging positive electrode and a second flow flowing outside the discharging positive electrode, and the metal-air battery system further comprises an oxygen-containing gas supply device for supplying an oxygen-containing gas to the electrolyte solution of the first flow.

7. The metal-air battery system according to claim 1, wherein the first electrode is the discharging positive electrode having a tubular shape, only the discharging positive electrode of the electrode device is inserted into the first opening and the third opening, and an oxygen-containing fluid supply device is provided to flow, inside the discharging positive electrode, a fluid containing oxygen.

8. The metal-air battery system according to claim 6, wherein the second electrode is the charging positive electrode, and the third electrode is the negative electrode.

9. The metal-air battery system according to claim 6, wherein the second electrode is the negative electrode, and the third electrode is the charging positive electrode.

10. The metal-air battery system according to claim 1, wherein the second electrode is the discharging positive electrode, each of the first chamber section and the second chamber section is internally provided with a separation member for separating a flow of the electrolyte solution in the chamber into a first flow flowing between the charging positive electrode and the discharging positive electrode, and a second flow flowing between the discharging positive electrode and the negative electrode, and the metal-air battery system further comprises an oxygen-containing gas supply device for supplying an oxygen-containing gas to the electrolyte solution of the first flow.

11. The metal-air battery system according to claim 10, wherein the first electrode is the charging positive electrode, and the third electrode is the negative electrode.

12. The metal-air battery system according to claim 10, wherein the first electrode is the negative electrode, and the third electrode is the charging positive electrode.

13. The metal-air battery system according to claim 1, wherein the discharging positive electrode includes a separation membrane on a surface facing the negative electrode.

* * * * *